United States Patent
Kwon et al.

(10) Patent No.: US 8,781,323 B2
(45) Date of Patent: Jul. 15, 2014

(54) PACKET TRANSPORT LAYER PASSIVE OPTICAL NETWORK (PTL-PON) PROVIDING SYSTEM AND METHOD

(75) Inventors: Yool Kwon, Incheon (KR); Hong Ju Kim, Daejeon (KR); Byung Ho Yae, Daejeon (KR); Kyung-Gyu Chun, Daejeon (KR); Young Boo Kim, Gongju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 908 days.

(21) Appl. No.: 12/950,987

(22) Filed: Nov. 19, 2010

(65) Prior Publication Data
US 2011/0150474 A1 Jun. 23, 2011

(30) Foreign Application Priority Data
Dec. 21, 2009 (KR) ........................ 10-2009-0128433

(51) Int. Cl.
*H04J 14/00* (2006.01)
(52) U.S. Cl.
USPC ............... 398/72; 398/66; 398/68; 398/45; 398/48; 398/63; 398/49; 370/352; 370/389; 370/392; 370/468
(58) Field of Classification Search
USPC .......... 398/66, 57, 68, 69, 70, 71, 72, 63, 45, 398/48, 49, 50, 54, 58, 59, 98, 99, 100, 67, 398/33; 370/352, 392, 389, 468, 230, 370/395.41, 395.53, 401, 254
See application file for complete search history.

(56) References Cited

U.S. PATENT DOCUMENTS

| | | | |
|---|---|---|---|
| 6,023,467 A | 2/2000 | Abdelhamid et al. | |
| 6,570,886 B1 | 5/2003 | De Groote et al. | |
| 8,200,088 B2 * | 6/2012 | Sone et al. | 398/72 |
| 2005/0135365 A1 | 6/2005 | Sung et al. | |
| 2006/0182132 A1 | 8/2006 | Kim et al. | |
| 2007/0133549 A1 | 6/2007 | Lee et al. | |
| 2008/0226293 A1 | 9/2008 | Ogushi | |
| 2009/0060503 A1 * | 3/2009 | Yin et al. | 398/48 |
| 2012/0163817 A1 * | 6/2012 | Kwon et al. | 398/63 |

FOREIGN PATENT DOCUMENTS

| KR | 1020040036101 A | 4/2004 |
|---|---|---|
| KR | 10-2005-0060862 A | 6/2005 |
| KR | 10-2007-0061235 A | 6/2007 |

* cited by examiner

*Primary Examiner* — Hanh Phan

(57) ABSTRACT

A packet transport layer passive optical network providing method controls an optical line termination device and an optical network terminal or an optical network unit of the subscriber end to transport packet transport layer passive optical network packets between the optical network terminals or the optical network units and the optical line termination device, and the optical network terminals or the optical network unit of the subscriber end becomes an end point of a packet transport layer connection.

5 Claims, 6 Drawing Sheets

PACKET TRANSPORT LAYER PASSIVE OPTICAL NETWORK (PTL-PON) PROVIDING SYSTEM AND METHOD

CROSS-REFERENCE TO RELATED APPLICATION

This application claims priority to and the benefit of Korean Patent Application No. 10-2009-0128433 filed in the Korean Intellectual Property Office on Dec. 21, 2009, the entire contents of which are incorporated herein by reference.

BACKGROUND OF THE INVENTION (a) Field of the Invention

The present invention relates to a packet transport layer (PTL) applied passive optical network providing method.

(b) Description of the Related Art

Regarding recent communication networks, most communication services have been made into packets as the Internet has become more important, and packet transport layer (PTL) skills with great reliability have been applied to the communication networks in order to provide the voice service of the voice over Internet protocol (VoIP) and the video service of the Internet protocol television (IPTV) to the Internet in a secure manner.

The PTL type provides the entire communication service with packets in order to increase the Internet's reliability, and accurately transmits the packets on the circuit level. However, since such type guarantees packet transmission quality but is not applicable to the access network, it is not guaranteed from one subscriber end to another subscriber end and is only applicable to communication between stations.

The existing passive optical network (PON) type includes the Ethernet PON (E-PON) type and the gigabit PON (G-PON) type.

The E-PON type is appropriate for Ethernet communication configured to Ethernet switches, and the G-PON type is available for not only Ethernet but also asynchronous transfer mode (ATM) and circuit communication.

So the PON type is easily applied to the Ethernet, and is not applicable to the PTL network that requires setting a connection in order to guarantee quality.

FIG. 1 shows networks to which the existing PTL type is applied and access networks to which the E-PON type is applied.

The packets generated at optical network terminals (ONT) 20 or optical network units (ONU) 20 of subscriber ends 10, 11, and 12 are passed through an optical line termination device (OLT) 24 and are concentrated at a first concentration switch 30.

The concentrated packets are passed through a switch or a router of the metro network 100 and the core network 200 and are distributed through a second concentration switch 32.

A PTL path 400 of the metro network 100 and the core network 200 is set by a server (not shown) and managed the path state. However, only physical links of concentration channels 40, 41, and 42 and distribution channels 43, 44, and 45 are set by an E-PON server, but the channel states are not managed.

Here, the channels 40, 41, and 42 from the ONT or ONU 20 of the subscriber ends 10, 11, and 12 are concentrated at the first concentration switch 30, and the distribution channels 43, 44, and 45 are distributed from the second concentration switch 32 to other subscriber ends 13 and 14.

Therefore, when an error occurs during transport of information, it is possible to check whether the error is generated by the metro network 100 and the core network 200, but it is difficult to check whether it is generated by the access network 300 of the concentration channels 40, 41, and 42 or the access network 300 of the distribution channels 43, 44, and 45.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a packet transport layer passive optical network (PTL-PON) providing system and method.

An exemplary embodiment of the present invention provides a method for a PTL connection server to provide a PON of a PTL, the PTL connection server being connected directly to OLT's and PTL switches, connected indirectly to ONT/ONU's of subscriber ends, and setting connections, comprising:

managing to transmit/receive PTL-PON packets between an ONT/ONU of the subscriber end and an OLT; and setting the ONT/ONU to be an end point of a PTL connection.

Another exemplary embodiment of the present invention provides a packet transport layer-passive optical network (PTL-PON) providing system connected to optical network terminals or optical network units (ONT/ONU's) and an optical line termination device (OLT) and setting a connection, including: a PTL connection server for setting a PTL channel in whole networks between an ONT/ONU of a subscriber end and another ONT/ONU of the opposite side of a subscriber end, bundling a plurality of the set PTL channels to set the same as a PTL path in a metro network and a core network, and managing the connection states of entire intervals through the set PTL channel and the PTL path; and an OLT located between the ONT/ONU and the PTL switch, controlling the ONT/ONU's, and converting a format of the packet into another according to a transport direction of the received packet, and transporting the same.

DETAILED DESCRIPTION OF THE EMBODIMENTS

Figure 1:
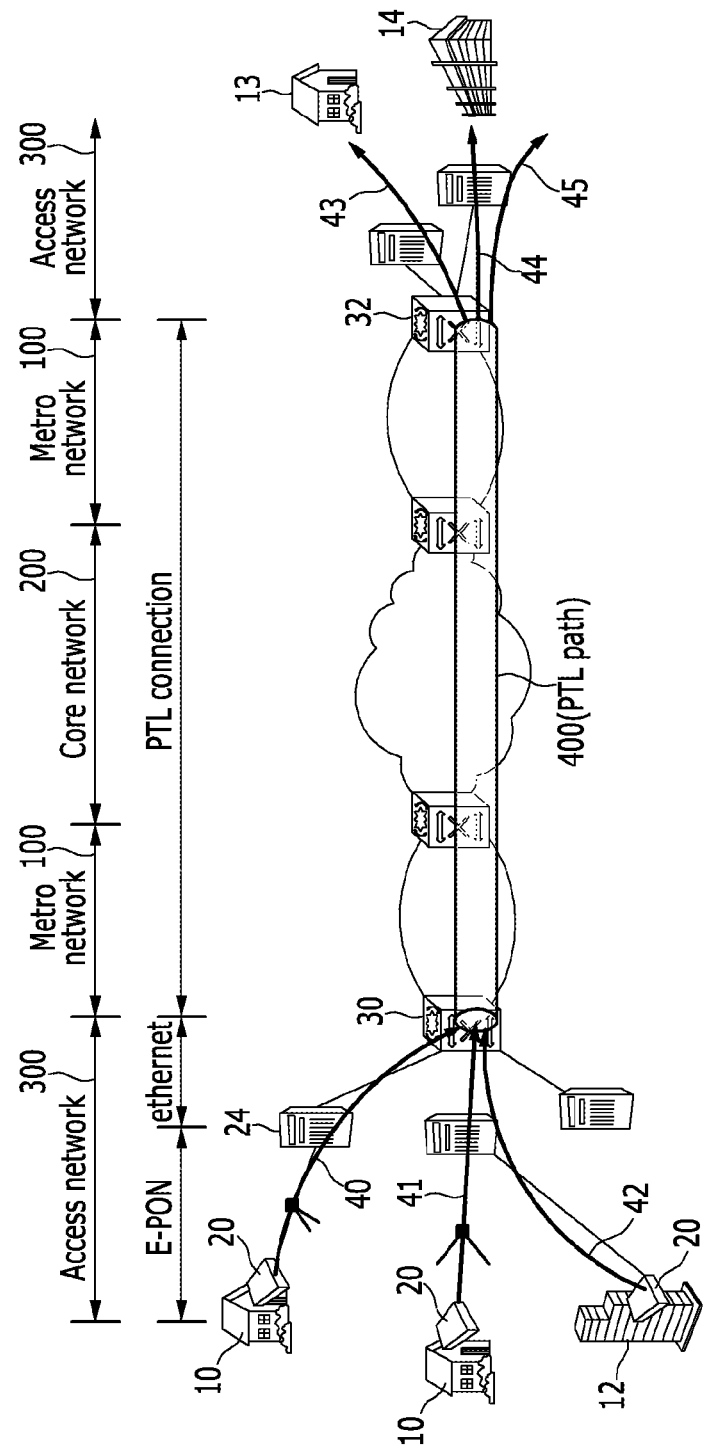
FIG. 1 shows networks to which the existing PTL type is applied and an access network to which the E-PON type is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Figure 2:
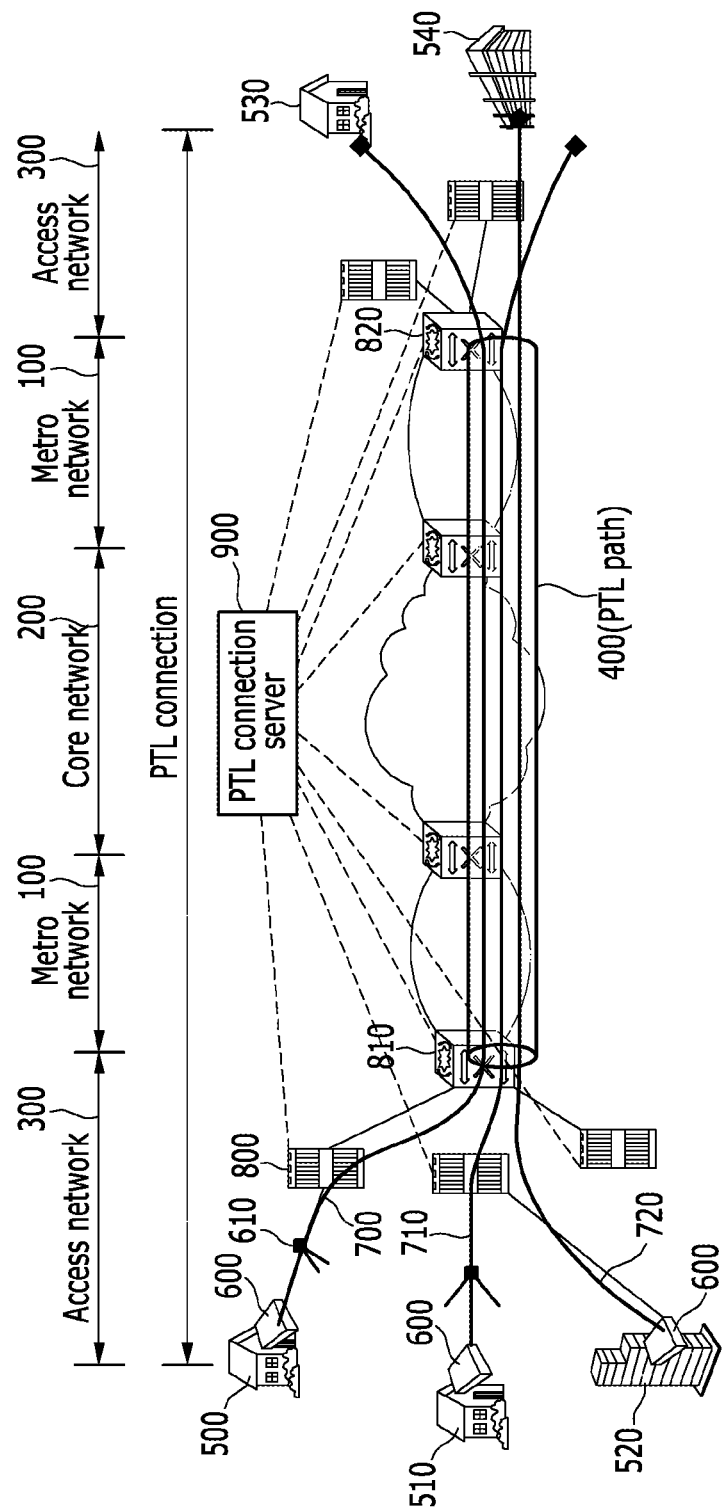
FIG. 2 shows networks to which a PTL-PON providing system according to an exemplary embodiment of the present invention is applied.

FIG. 2 shows networks to which a PTL-PON providing system according to an exemplary embodiment of the present invention is applied.

The PTL-PON providing system includes an OLT 800 for the PTL and a PTL connection server 900. In addition, the PTL-PON providing system includes an ONT/ONU 600 for the PTL-PON installed in subscriber ends 500, 510, and 520 and a remote node (RN) 610.

Provision for a single subscriber will be called an ONT, and provision for a plurality of subscribers will be referred to as an ONU. In the embodiment of the present invention, the ONT and the ONU will be combined to be an ONT/ONU.

The OLT 800 converts the packets into a specific format and transports the same depending on whether the transport direction of the packets received between the ONT/ONU 600 of the subscriber ends 500, 510, 520, 530, and 540 and the PTL switches 810 and 820 is the direction of the subscriber ends 500, 510, and 520 (i.e., downward direction) or the direction of the PTL switches 810 and 820 (i.e., upward direction).

The OLT 800 collects the packets generated by the ONT/ONU 600 of the subscriber ends 500, 510, 520, 530, and 540. And then The PTL switch 810 or 820 collects the packets secondly by bundling the channels 700, 710, and 720 and transports packets in the same direction through a PTL path 400 in the metro network 100 and the core network 200.

The PTL connection server 900 sets the PTL path 400 and the PTL channels 700, 710, and 720 to control the connection states of all intervals. In this instance, the PTL channels 700, 710, and 720 are connected between the ONT/ONU 600 and the opposite side of subscriber ends.

On the metro network 100 and the core network 200 the PTL method is applied, and on the access network 300 the PTL-PON method is applied thereto. The PTL connection server 900 sets a PTL connection including the PTL channels 700, 710, and 720 and the PTL path 400 and manages the same.

In the case of setting the PTL channels 700, 710, and 720, the PTL connection server 900 makes a mapping table mapping the PTL header to the PTL-PON header and delivers the mapping table to the OLT 800, wherein the PTL-PON headers may include a logical link identifier (LLID) and a port number.

The ONT/ONU 600, the OLT 800, and the PTL switches 810 and 820 control connection states by using the functions, such as continuity check, loopback check, and alarm indication signal/remote detect indication (AIS/RDI) for the PTL connection that are the operation and maintenance (OAM) functions defined by provider backbone bridges (PBB), on the access network 300, the metro network 100, and the core network 200.

The packets generated by the subscriber ends 500, 510, 520, 530, and 540 are controlled during transport and are then transported to the other subscriber end.

Figure 3:
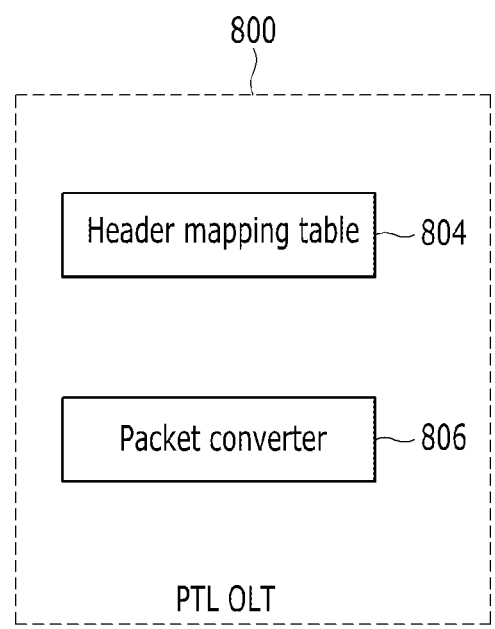
FIG. 3 shows a block diagram of an inner configuration of an OLT of a PTL according to an exemplary embodiment of the present invention.
Figure 4:
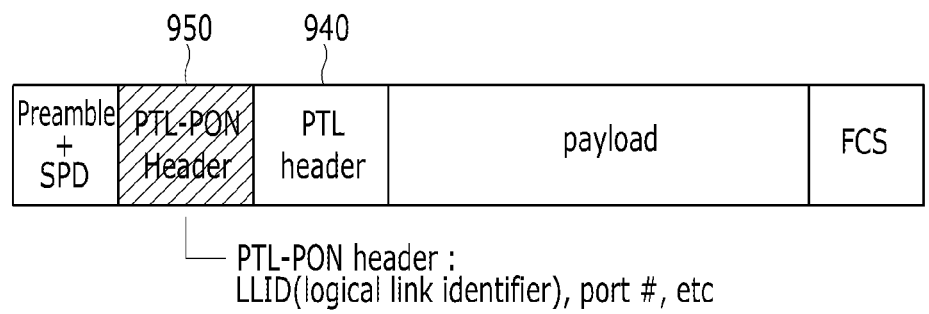
FIG. 4 shows a format of a PTL-PON packet according to an exemplary embodiment of the present invention.
Figure 5:
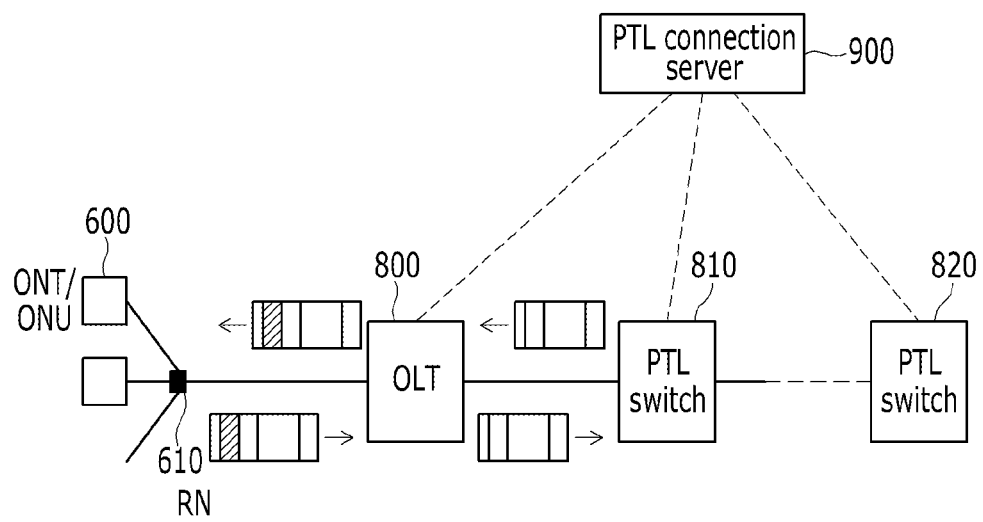
FIG. 5 shows a conversion process when packets are transported according to an exemplary embodiment of the present invention.

FIG. 3 shows a block diagram of an inner configuration of an OLT 800 of a PTL according to an exemplary embodiment of the present invention, FIG. 4 shows a format of a PTL-PON packet according to an exemplary embodiment of the present invention, and FIG. 5 shows a conversion process when packets are transported according to an exemplary embodiment of the present invention.

The OLT 800 for the PTL includes a header mapping table 804 and a packet converter 806.

The OLT 800 receives the header mapping table 804 from the PTL connection server 900, in which the PTL header 940 and the PTL-PON header 950 are mapped.

As shown in FIG. 4, the metro network 100 and the core network 200 use the PTL packet format and the access network 300 uses the PTL-PON packet format. The PTL-PON packet format further includes a LLID for identifying the ONT/ONU and a port number for identifying the port of the ONT/ONU in addition to the PTL packet format.

Upon receiving a PTL packet, the packet converter 806 checks the header of the PTL packet to determine whether the PTL packet is transported in the direction of the ONT/ONU's 600 (i.e., downward direction) or in the direction of the PTL switches 810 and 820 (i.e., upward direction.)

When the transport direction of a PTL packet is downward, the packet converter 806 attaches the LLID and the port number of the corresponding ONT/ONU 600 to the PTL packet by using the header mapping table, converts the same into the PTL-PON format, and transports it to the ONT/ONU 600 through the RN 610. In this instance, the LLID represents an identifier for identifying a plurality of branches of an optical link, and it is used to identify the ONT/ONU 600, where a plurality of ONT/ONU's 600 are connected to the OLT 800. The port number identifies ports of the ONT 600 or the ONU 600. For example, if an IP phone and an IPTV are connected to the ONT 600 of a subscriber end, the port number for IP phone is one and that for IPTV is two.

When the transport direction of a PTL packet is upward, the packet converter 806 detaches the PTL-PON header 950 from the PTL-PON packet and transports it to the PTL switches 810 and 820.

Figure 6:
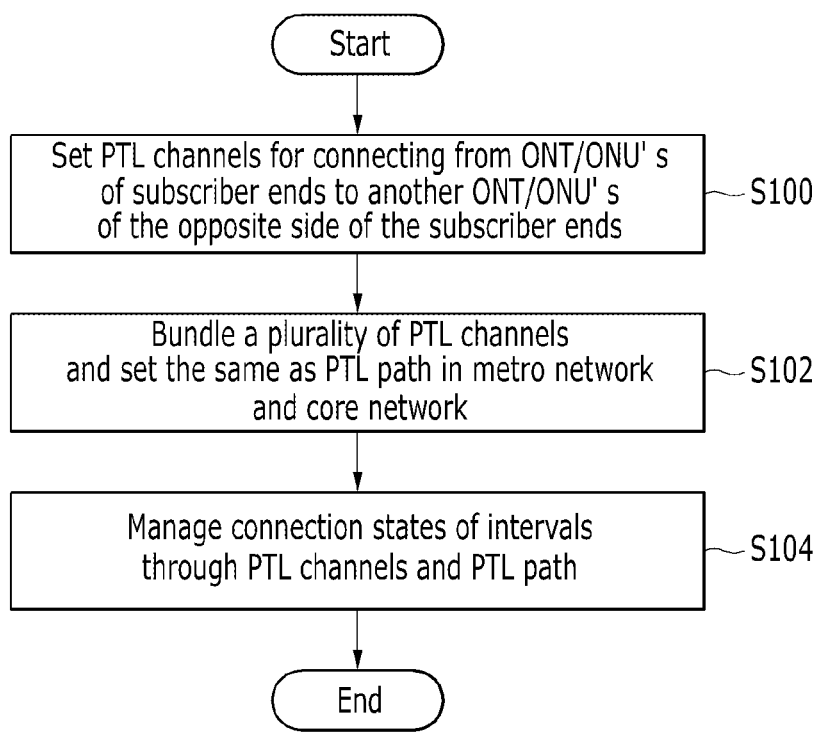
FIG. 6 shows a PTL-PON providing method according to an exemplary embodiment of the present invention.

FIG. 6 shows a PTL-PON providing method according to an exemplary embodiment of the present invention.

The PTL connection server 900 sets the channels 700, 710, and 720 on which packets generated by the ONT/ONU's 600 of the subscriber ends 500, 510, and 520 are concentrated at the PTL switch 810, transported continuously to the PTL switch 820, and distributed to the opposite side of the subscriber ends 530, 540, and etc. (S100).

The PTL connection server 900 bundles the set PTL channels 700, 710, and 720 and sets them to be a PTL path 400 in the metro network 100 and the core network 200 (S102).

The PTL connection server 900 manages the connection states of the entire connections, such as the PTL channels 700, 710, and 720 and the PTL path 400 (S104).

The PTL connection server 900 generates a header mapping table by using the PTL header 940 and the PTL-PON header 950 (LLID, port number) that are set when the PTL channel is set, and delivers the header mapping table to the OLT 800. Accordingly, the OLT 800 converts the packet format according to the transport direction of the received packet by using the mapping table provided by the PTL connection server 900.

According to an embodiment of the present invention, the PTL skill is applied to the access network to manage connections with end-to-end. The PTL skill that is used in the metro network and the core network is extensively applied to the access network to transport highly reliable packet information to the subscriber end.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a packet transport layer (PTL) connection server to provide a passive optical network (PON) of a PTL, the PTL connection server being connected directly to an optical line termination device (OLT) and PTL switches, connected indirectly to an optical network terminal or optical network unit (ONT/ONU) of a subscriber end, and setting connections, comprising:

managing to transmit/receive PTL-PON packets between an ONT/ONU of the subscriber end and an OLT; and
   setting the ONT/ONU of the subscriber end to be an end point of a PTL connection, wherein
   the setting of the ONT/ONU of the subscriber end to be an end point of the PTL connection includes:
   setting a channel from the ONT/ONU of the subscriber end to another ONT/ONU of the opposite side of the subscriber end through the OLT and the PTL switches for transporting the packets as the PTL channel in an access, a metro, and a core networks;
   bundling a plurality of set PTL channels to be a PTL path in a metro network and a core network; and
   managing the connection states of intervals through the set PTL channel and the PTL path.

2. A packet transport layer-passive optical network (PTL-PON) providing system connected to optical network terminals or optical network units (ONT/ONU's) and an optical line termination device (OLT) and setting a connection, comprising:

a PTL connection server for setting a PTL channel in whole networks between an ONT/ONU of the subscriber end and another ONT/ONU of the opposite side of the subscriber end, bundling a plurality of the set PTL channels to set the same as a PTL path in a metro network and a core network, and managing the connection states of intervals through the set PTL channel and the PTL path; and
   an OLT located between the ONT/ONU's of the subscriber ends and the PTL switch and converting a format of the packet into another according to a transport direction of the received packet, and transporting the same.

3. The system of claim 2, wherein
the OLT:
receives a first PTL packet, checks a header of the first PTL packet, and determines whether the first PTL packet is transported in a first direction of the ONT/ONU of the subscriber end or a second direction of the PTL switch; and
in the case of the first direction attaches a logical link identifier (LLID) for identifying the ONT/ONU of the subscriber end and a port number for identifying the port of the ONT/ONU to the PTL packet, converts the same into a PTL-PON packet, and transports the same, and in the case of the second direction detaches the LLID and the port number from the PTL-PON packet, converts into the PTL packet, and transports the same.

4. The system of claim 3, wherein
the OLT receives a header mapping table for mapping the PTL packet header to the PTL-PON packet header from the PTL connection server and storing it.

5. The system of claim 2, wherein
the PTL connection server generates a header mapping table by mapping the PTL packet header to the PTL-PON packet header and delivers the header mapping table to the OLT, the PTL-PON packet header including a LLID of the ONT/ONU of the subscriber end and a port number for identifying the port of the ONT/ONU of the subscriber end.

* * * * *